US006942391B2

(12) United States Patent
Nakamura

(10) Patent No.: US 6,942,391 B2
(45) Date of Patent: Sep. 13, 2005

(54) CRANKSHAFT SUPPORTER

(75) Inventor: Makoto Nakamura, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 111 days.

(21) Appl. No.: 10/601,778

(22) Filed: Jun. 23, 2003

(65) Prior Publication Data

US 2004/0017956 A1 Jan. 29, 2004

(30) Foreign Application Priority Data

Jun. 27, 2002 (JP) ....................................... 2002-187754

(51) Int. Cl.[7] ............................ F16C 9/00; F16C 35/02; F02F 7/00

(52) U.S. Cl. ............... 384/432; 123/195 R; 29/898.049

(58) Field of Search ................................ 384/294, 432, 384/433; 123/195 R, 195 H, 195 C; 92/140; 164/98, 111, 112; 29/898.042, 898.049

(56) References Cited

U.S. PATENT DOCUMENTS

| | | | | | |
|---|---|---|---|---|---|
| 4,693,216 | A | * | 9/1987 | Ampferer et al. | 384/433 |
| 5,203,854 | A | * | 4/1993 | Nilsson et al. | 384/433 |
| 5,769,546 | A | * | 6/1998 | Wuest | 384/294 |
| 6,543,334 | B2 | | 4/2003 | Yamauchi | |
| 6,675,763 | B1 | * | 1/2004 | Ratzi et al. | 123/195 R |
| 2003/0116114 | A1 | * | 6/2003 | Rengmyr | 123/195 R |

FOREIGN PATENT DOCUMENTS

| | | |
|---|---|---|
| JP | 2000-337348 | 5/2000 |
| JP | 2001-071117 | 3/2001 |
| JP | 2002-061538 | 2/2002 |

* cited by examiner

*Primary Examiner*—Thomas R. Hannon
(74) *Attorney, Agent, or Firm*—Flynn, Thiel, Boutell & Tanis, P.C.

(57) ABSTRACT

A crankshaft supporter having a bearing holder molded in aluminum alloy and having a bearing for supporting a crankshaft. A preform member is cast inside of the aluminum alloy. A screw hole having one opened end is formed in an outer surface of the bearing holder. A concave recess section is formed in the preform member to accommodate a bottom of the screw hole. An introduction passage is provided in the recess section to introduce molten metal therein during casting to prevent blowholes.

18 Claims, 8 Drawing Sheets

CRANKSHAFT SUPPORTER

FIELD OF THE INVENTION

This invention relates to crankshaft supporters, and more particularly to a crankshaft supporter having a preform member (a core material) cast or embedded inside thereof, and to a method of making same.

BACKGROUND OF THE INVENTION

Some vehicle engines include a cylinder block having a cylinder head coupled to an upper part thereof and a lower crankcase coupled to a lower part thereof. The cylinder block and lower crankcase function as a crank supporter. That is, a bearing holder in the cylinder block and a bearing holder in the lower crankcase respectively maintain a bearing in the cylinder block and a bearing in the lower crankcase for supporting the crankshaft.

In addition, the crankshaft is typically cast of iron. For weight reduction, the cylinder block and the lower crankcase are cast of aluminum alloy. When forming the cylinder block and the lower crankcase of aluminum alloy, materials having lower thermal expansion than that of aluminum alloy are cast (embedded) therein to reduce thermal expansion of the bearing holders. Fiber-reinforced metal (FRM) is employed as one of the methods for casting. More particularly, the fiber-reinforced material is fired and shaped into a certain form to produce a preform body (a core). By penetrating aluminum alloy into the preform body during casting of the lower crankcase, the preform body of fiber reinforced material is formed into the crankcase to reduce thermal expansion of the bearing holder. This reduces oil clearances between the crankshaft and the bearing holder, and reduces vibration or noise.

Referring to FIG. 17, an engine 202 mounted on a vehicle (not shown) includes a cylinder head (not shown) on top of a cylinder block 204, a lower crankcase 206 at the bottom of the cylinder block 204, and an oil pan 208 at the bottom of the lower crankcase 206. The cylinder block 204 and lower crankcase 206 are formed by e.g., die casting, with the casting material being aluminum alloy.

A semicircular bearing holder 210 in the cylinder block 204 and a semicircular bearing holder 212 in the lower crankcase 206 respectively sustain bearings 214, 216 to support a crankshaft 218 therebetween. The crankshaft 218 is made of iron.

The cylinder block 204 includes cylinder bores (not shown) for cylinders formed longitudinally in series by cores (not shown) during casting. Blowby passages 222-1, 222-2 are formed adjacent outer walls 220-1, 220-2 in the cylinder block 204, which passages extend upwardly and open at top ends. In the lower crankcase 206, upwardly extending blowby passages 226-1, 226-2 are formed by cores (not shown) during casting and are adapted to communicate with the blowby passages 222-1, 222-2, and are positioned adjacent outer walls 224-1, 224-2. The blowby passages 222, 226 also serve as an oil drop to permit downwardly flow of oil from above.

Threaded coupling bolt screw holes 228-1, 228-2 are defined in the bearing holder 210 of the cylinder block 204 and open at the bottom wall 204B thereof. A main oil gallery 230 is formed toward an upper part of the blowby passage 222-2. A journal oil passage (i.e. oil supply hole for the crank journal) 232 extends upwardly from an inner circumference of the bearing holder 210 to communicate with the gallery 230.

First and second case bolt holes 234-1, 234-2 are defined in the lower crankcase 206 to communicate with the coupling bolt screw holes 228-1, 228-2 in the cylinder block 204. More than one oil pan mounting screw holes 236 are defined in an outer flange of the crankcase at a bottom 206B thereof. On an outer surface 212F of the bearing holder 212 in the lower crankcase, a protruding portion 238 is formed and extends to the bottom surface 206B. The protruding portion 238 has a parts mounting bolt screw hole 240 for mounting parts, and one end 240E of the hole 240 opens downwardly.

The cylinder block 204 has the cylinder head (not shown) threadedly fixed thereto from above by mounting bolts (not shown). In the lower part of the cylinder block 204, the lower crankcase 206 is fixed to the cylinder block 204 by inserting first and second case mounting bolts 242-1, 242-2 from below into coupling bolt screw holes 228-1, 228-2 through the first and second case bolt holes 234-1, 234-2. A parts mounting member 246 is attached to the crankcase 206 by a parts mounting bolt 244 that is threadedly attached to the screw hole 240. An oil pan 208 is attached to the lower crankcase 206 by oil pan mounting screws (not shown) that are inserted into the mounting screw holes 236.

The bearing holder 212 in the lower crankcase 206 includes a formed body 248 with a fiber-reinforced metal (FRM) portion. The body 248 is formed by penetrating aluminum alloy into a preform member (a core material) 250 when casting the lower crankcase 206. The preform member 250 is shaped into a form adapted to a shape of the bearing holder 212 in the crankcase by firing the reinforced fiber material, and the formed body 248 having the FRM portion is produced by penetrating aluminum alloy into the preform 250 when casting the lower crankcase 206.

As shown in FIGS. 18 and 19, the preform member 250 includes first and second bolt insert holes 254-1, 254-2, in first and second cylindrical bolt support sections 252-1, 252-2, that vertically penetrate through upper and lower surfaces 250U, 250B and are shaped by a mold (not shown). Also, a recessed section 256 is preformed adjacent the bottom of the preform member 250. The recessed section 256 includes therein a cylindrical concave-shaped hole 258 that has a bore diameter Ø and a predetermined depth D measured from the bottom surface 250B so as to accommodate the bottom 240B of the screw hole 240.

Referring to FIG. 20, the lower crankcase 206 is formed when aluminum alloy is poured as molten metal (matrix) into a casting mold 260 to cast the preform member 250 inside. The mold 260 includes upper and lower mold parts 260-1, 260-2. The upper and lower mold parts 260-1, 260-2 have first upper and lower pins (not shown) corresponding to the first case bolt hole 234-1, and second upper and lower pins (not shown) corresponding to the second case bolt hole 234-2.

In casting, as shown in FIG. 20, the lower crankcase 206 is turned upside down and is positioned in a space 262 of the lower mold part 260-1. The upper surface 250U of the preform member 250 is aligned with a plane at a certain distance above the bottom of the space 262. The bottom 250B of the preform member 250 is aligned with a plane at a certain distance below a bottom of the upper mold part 260-2. The sides 250C are aligned with planes at a certain distance from the sides of the space 262. A reentrant 264 is formed in the upper mold 260-2 at a position aligned with the hole 258 to define the protruding portion 238.

In casting the lower crankcase 206, the molten metal is poured through a left inlet 266 at an upper part of the lower mold part 260-1. The molten metal passes through the lower mold part 260-1 and around the preform member 250 and to a right outlet 268 at the upper part of the lower mold part 260-1. The molten metal of aluminum alloy penetrates into the preform member 250 to form the FRM portion of the formed body 248. After casting, the parts mounting bolt screw hole 240 is processed for threading so as to project into the hole 258 defined in the recessed portion 256.

Such crankshaft supporter is disclosed in e.g., JP Laid-Open Nos. 2002-61538, 2000-337348, and 2001-71117 Official Gazettes. According to the crankshaft supporter disclosed in JP Laid-Open No. 2002-61538, and corresponding U.S. Pat. No. 6,543,334, both owned by the Assignee hereof, a lower crankcase includes an aluminum alloy layer in sliding portions of a bearing supporter, and a composite material around the aluminum alloy layer, which composite material has a lower coefficient of thermal expansion than that of the layer. According to the crankshaft supporter disclosed in JP Laid-Open No. 2000-337348, a bearing supporter in a lower crankcase is formed of a porous material, and a material around the bearing supporter is flowed into pores of the bearing supporter. According to the disclosure in JP Laid-Open No. 2001-71117, a particular section corresponding to a side of a preform member to which molten metal is poured has a rigidity greater than that of other parts.

As shown in FIG. 20, in the conventional crankshaft supporter, when the bearing holder to support the bearing for the crankshaft is molded in aluminum alloy, that is, when the bearing holder of the lower crankcase 206 is molded in aluminum alloy, the preform member 250 including reinforced fiber of lower coefficient of heat expansion is cast (embedded) inside of the bearing holder 212 so as to prevent vibration or noise resulting from clearance of the bearing 216 in the lower crankcase by heat expansion. In addition, when the hole 240 having the opened lower end 240E is to be formed in the outer surface 212F of the bearing holder 212 so as to attach the parts mounting member 246, since the preform member 250 is hard (rigid) and difficult to machine, the hole 258 is pre-formed in the preform member 250 so that the aluminum alloy layer is deposited inside in order to improve cutting or machining of the screw hole 240.

However, the hole 258 is formed in a cylindrical shape with a bottom portion corresponding to the bottom portion 240B of the screw hole 240 as shown in FIG. 17. Due to this shape, the molten metal does not properly flow to the bottom 258B of the hole 258 during casting, thereby producing undesirable blowholes (cavities) P as shown in FIG. 21.

To obviate or minimize the above problem, the present invention provides an improved crankshaft supporter. A bearing holder molded in aluminum alloy supports a bearing that supports a crankshaft. A preform member is cast inside of the aluminum alloy. A screw hole having one opened end is formed in an outer surface of the bearing holder. A concave recess section is formed in the preform member to accommodate a bottom of the screw hole. An introduction means is provided in the recess section to introduce molten metal therein during casting.

According to the present invention, the screw hole having one opened end is defined in the outer surface of the bearing holder, and the concave recess section in the preform member is formed to accommodate the bottom of the screw hole, and the introduction means is provided in the recess section to introduce molten metal therein during casting. As a result, the molten metal is introduced to the bottom of the recess section to effectively prevent blowholes.

DETAILED DESCRIPTION

Embodiments of the present invention will now be described with reference to the drawings.

FIGS. 1–5 illustrate a first embodiment of the present invention.

Figure 5:
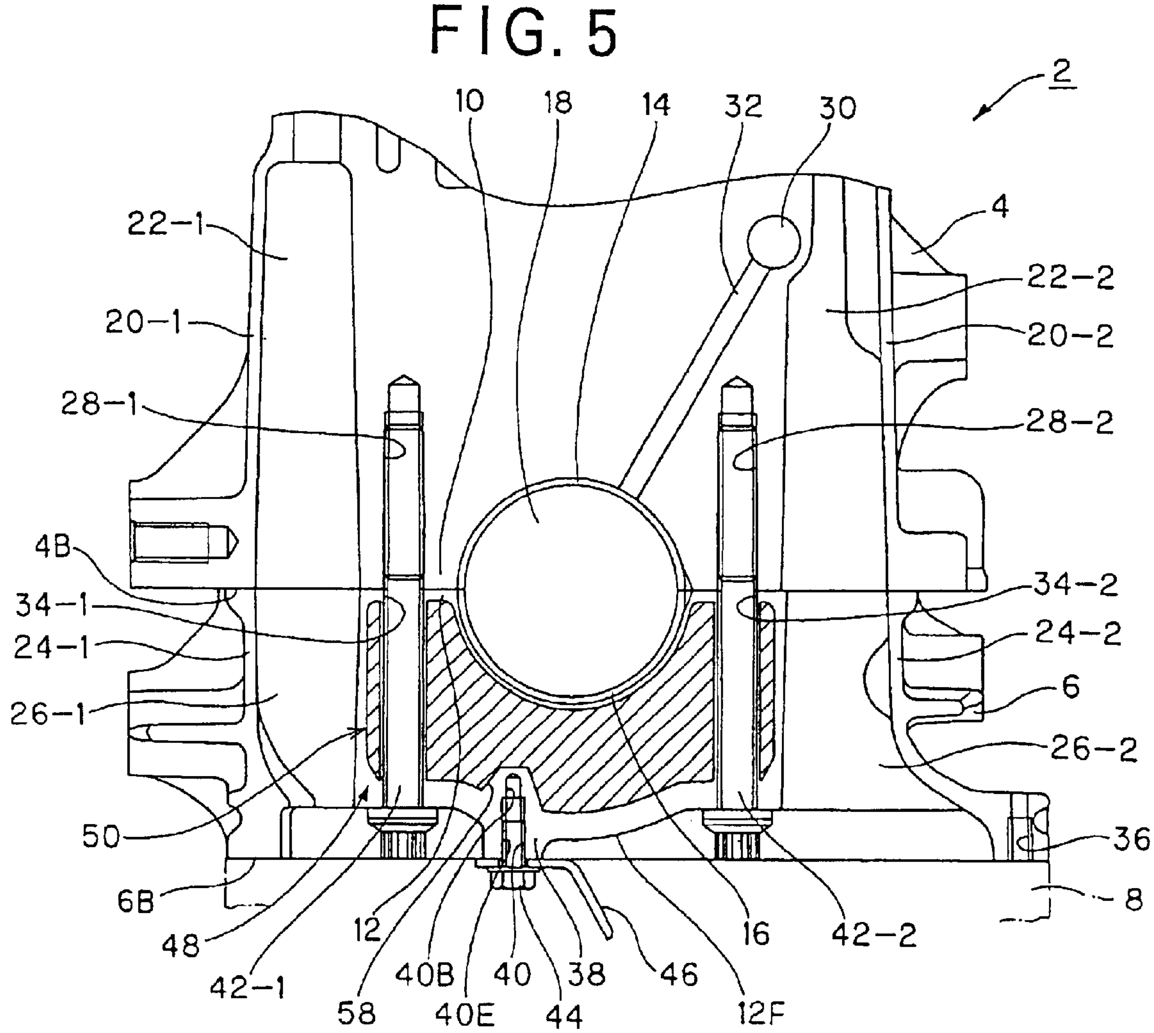
FIG. 5 is a cross-sectional view of an engine incorporating therein the first embodiment.

In FIG. 5, a vehicle (not shown) includes an in-line internal combustion engine 2, a cylinder block 4, a lower crankcase 6, and an oil pan 8. In the engine 2, the cylinder block 4 is provided with a cylinder head (not shown) on top thereof and the lower crankcase 6 at the bottom thereof. The oil pan 8 is attached to the bottom of the lower crankcase 6. The cylinder block 4 and the lower crankcase 6 are typically formed of aluminum alloy (matrix) and are cast by, e.g., die-casting.

The cylinder block 4 and the lower crankcase 6 function to support a crankshaft. A semicircular bearing holder 10 in the cylinder block 4 and a semicircular bearing holder 12 in the lower crankcase 6 respectively support a block-side bearing 14 and a case-side bearing 16 to carry a crankshaft 18. The crankshaft 18 is typically formed of iron.

In the cylinder block 4, a plurality of cylinder bores (not shown) are formed, one for each cylinder, longitudinally in series by cores (not shown) during casting. First and second blowby passages 22-1, 22-2 in the cylinder block extend vertically and have opened top ends and are formed adjacent first and second outer walls 20-1, 20-2. In the lower crankcase 6, first and second blowby passages 26-1, 26-2 are formed by cores (not shown) during casting adjacent first and second outer walls 24-1, 24-2. The blowby passages 26-1, 26-2 are adapted to communicate with the blowby passages 22-1, 22-2 respectively. The blowby passages 22, 26 also serve as an oil drop to permit downwardly flow of oil from above.

In the cylinder block 4, first and second threaded coupling bolt screw holes 28-1, 28-2 are defined in the bearing holder 10 of the cylinder block and open downwardly at bottom surface 4B. A main oil gallery 30 is formed toward an upper part of the blowby passage 22-2. A journal oil passage (i.e. oil supply hole for crank journal) 32 extends upwardly from an inner circumference of the bearing holder 10 for communication with the gallery 30.

First and second case bolt holes 34-1, 34-2 are defined in the lower crankcase 6 to communicate with the coupling bolt screw holes 28-1, 28-2 in the cylinder block 4. More than one opened oil pan mounting holes 36 are defined in an outer flange of the crankcase 6 and open upwardly from the bottom surface 6B. On an outer surface 12F of the bearing holder 12 in the lower crankcase, a protruding portion 38 for mounting parts is formed and extends to the bottom surface 6B. The protruding portion 38 has a parts mounting bolt screw hole 40 with end 40E thereof opening downwardly.

The cylinder block 4 has the cylinder head (not shown) threadedly fixed thereto from above by mounting bolts (not shown). In the lower part of the cylinder block 4, the lower crankcase 6 is fixed to the cylinder block 4 by inserting first and second mounting bolts 42-1, 42-2 from below into screw holes 28-1, 28-2 through the first and second holes 34-1, 34-2. A parts mounting member 46 is attached to the crankcase 6 by a mounting bolt 44 that is threadedly attached into the screw hole 40. The oil pan 8 is attached to the lower crankcase 6 by oil pan mounting screws (not shown) that are inserted into the mounting holes 36.

The bearing holder 12 in the lower crankcase 6 includes a formed body 48 having, for example, a fiber-reinforced metal (FRM) portion. The body 48 is formed by penetrating aluminum alloy into a preform member (core material) 50 while casting the lower crankcase 6. The preform member 50 is shaped into a form adapted to a shape of the bearing holder 12 in the crankcase by shaping a composite material, such as a reinforced alumina fiber material, and the formed body 48 having the FRM portion is produced by penetrating aluminum alloy into and around the preform member 50 during casting of the lower crankcase 6.

Figure 3:
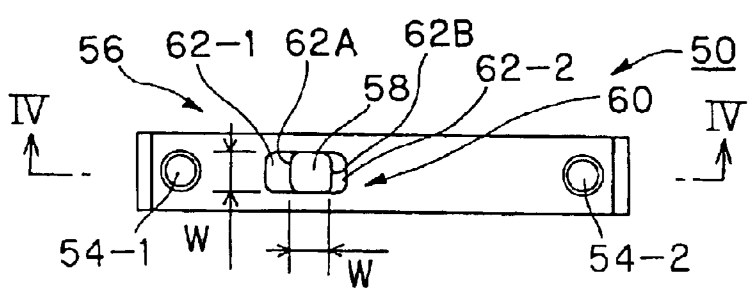
FIG. 3 is a plan view of a preform member of the first embodiment.
Figure 4:
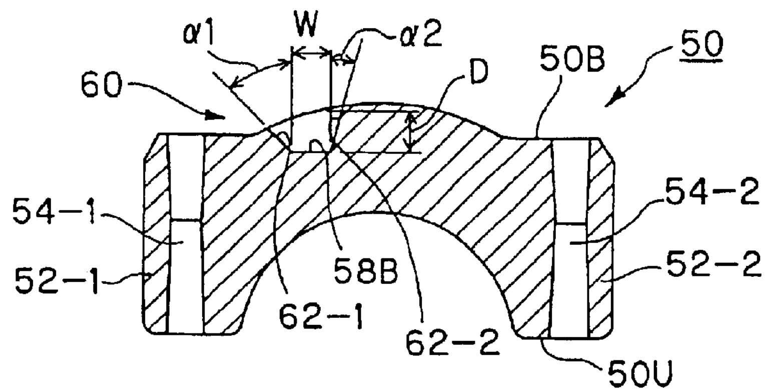
FIG. 4 is a cross-sectional view of the preform member taken along line IV—IV in FIG. 3.

As shown in FIGS. 3 and 4, the preform member 50 includes first and second cylindrical bolt insert holes 54-1, 54-2 that are shaped by a mold (not shown) and that penetrate through upper and lower surfaces 50U, 50B in first and second sections 52-1, 52-2 thereof. Also, a recess section 56 is preformed therein.

The recess section 56 in the first embodiment (FIGS. 1–4) includes a cylindrical concave-shaped hole 58 so that the bottom 40B of the screw hole 40 is accommodated therein. The hole 58 has a predetermined depth D measured from the bottom 58B. The hole 58 includes first and second inclined surfaces 62-1, 62-2 on opposite sides thereof which function as an introduction means 60 for the casting material. The first inclined surface 62-1 is inclined with respect to the flow direction X of the molten metal, and is inclined downwardly toward the first bolt insert hole 54-1 at an angle $\alpha$1. The second inclined surface 62-2 is inclined downwardly toward the second bolt insert hole 54-2 at an angle $\alpha$2 that is more acute than $\alpha$1. More particularly, the first inclined surface 62-1 is inclined toward the bolt insert hole 54-1 from a vertical line V1 of a side 62A at an angle of $\alpha$1. The second inclined surface 62-2 is inclined toward the bolt insert hole 54-2 from a vertical line V2 of a side 62B at an angle of $\alpha$2. The surfaces 62-1 and 62-2 are thus oppositely inclined, and the surface 62-2 is more steeply sloped or inclined than the surface 62-1.

Figure 1:
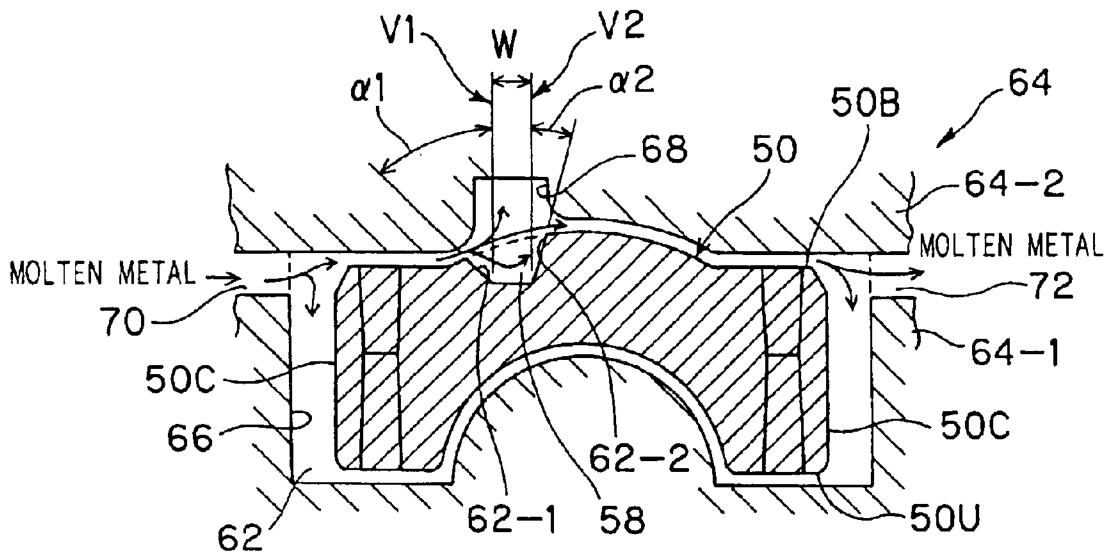
FIG. 1 is a cross-sectional view of a lower crankcase when casting according to a first embodiment of the invention.

Referring to FIG. 1, the lower crankcase 6 is formed while aluminum alloy (matrix) is poured as molten metal into a casting mold 64 to cast the preform member 50 inside the casting material. The mold 64 includes upper and lower mold parts 64-1, 64-2. The upper and lower mold parts 64-1, 64-2 have first upper and lower pins (not shown) adapted to form the first case bolt hole 34-1 (FIG. 5), and second upper and lower pins (not shown) adapted to form the second case bolt hole 34-2 (FIG. 5).

Next, an explanation will be given as to the operation of the above-described embodiment.

In casting, as shown in FIG. 1, the lower crankcase 6 is turned upside down and the preform member 50 is positioned in a space 62 in the lower mold part 64-1. The upper surface 50U) of the preform member 50 is aligned with a plane at a certain distance from the bottom of the lower mold part 64-1. The bottom 50B of the preform member 50 is aligned with a plane at a certain distance from a bottom of the upper mold part 64-2. A side 50C of the preform member 50 is aligned with a plane defined by a surface 66 of the lower mold part 64-1 at a certain distance across the space 62. A reentrant or recess 68 that corresponds to the shape of the protruding portion 38 is formed in the upper mold part 64-2 at a portion aligned with the hole 58.

In casting the lower crankcase 6, the molten metal is poured through a left inlet 70 at an upper part of the lower mold part 64-1. The molten metal passes into and through the lower mold part 64-1 and around the preform member 50 and to a right outlet 72 at the upper part of the lower mold part 64-1.

Figure 2:
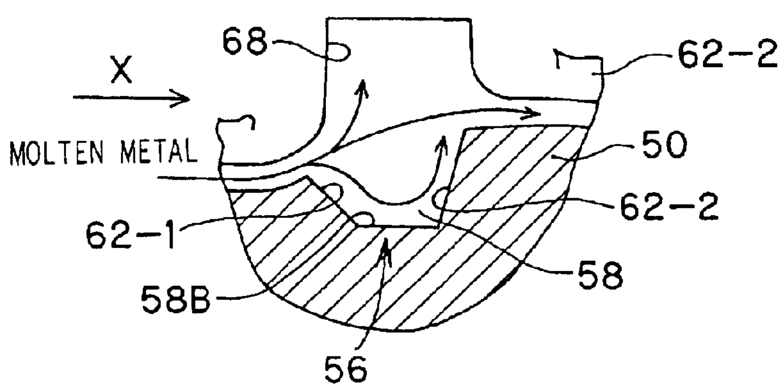
FIG. 2 is an enlarged cross-sectional view of the recess in FIG. 1.

In the recess section 56, the inclined surfaces 62-1, 62-2 as the introduction means 60 are formed on opposite sides of the hole 58. As shown in FIG. 2, the molten metal flowing from the inlet 70 reaches the bottom 58B from the first inclined surface 62-1, and then smoothly passes away along the second inclined surface 62-2. And then, aluminum alloy as the matrix, penetrates into the material of the preform 50 to form the fiber-reinforced metal portion or body 48.

As a result, in casting the lower crankcase 6, the molten metal can be introduced to the bottom 58B of the hole 58 in the recess section 56 to thus prevent blowholes.

The recess section 56 includes the hole 58, and the introduction means 60 includes the inclined surfaces 62-1, 62-2 that are inclined with respect to the flow direction of the molten metal. Accordingly, the molten metal is easily introduced to the bottom 58B in the hole 58 to effectively prevent blowholes.

Figure 6:
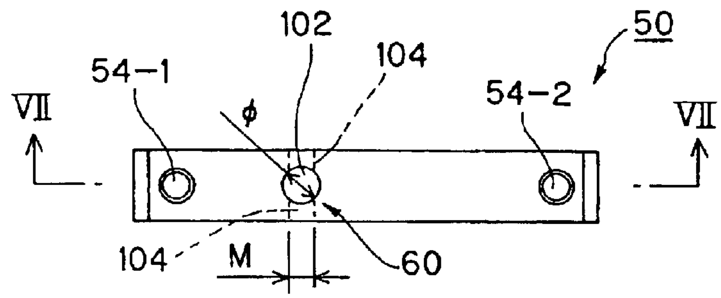
FIG. 6 is a plan view of the preform member according to a second embodiment.
Figure 7:
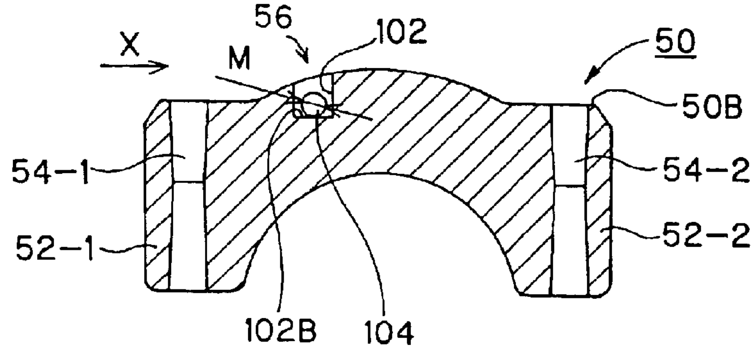
FIG. 7 is a cross-sectional view of the preform member taken along line VII—VII in FIG. 6.

FIGS. 6 and 7 illustrate a second embodiment of the present invention.

The same reference numerals are hereinafter utilized for features identical or similar in function to those described in the first embodiment.

The second embodiment is characterized in that the recess section 56 in the preform member 50 includes a cylindrical hole 102 having a diameter Ø. In addition, the introduction means 60 includes an introduction passage 104 that penetrates (cuts through) both the inner wall of the hole 102 and the outer surfaces of the preform material 50, which passage 104 extends orthogonally to an axis of the hole 102. The passage 104 communicates adjacent the bottom of the hole 102.

According to this second embodiment, in the recess section 56 in the preform member 50, the molten metal can be easily introduced to the bottom 102B of the hole 102 to effectively prevent blowholes, even if a space for forming the inclined surface is not provided.

Figure 8:
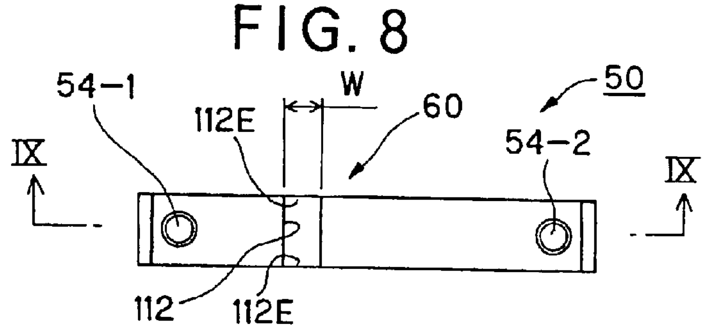
FIG. 8 is a plan view of a preform member according to a third embodiment.
Figure 9:
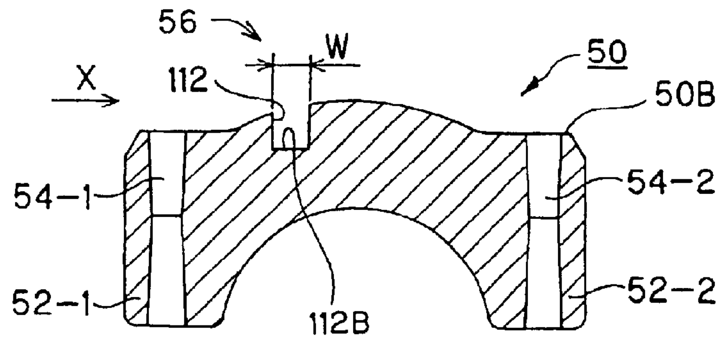
FIG. 9 is a cross-sectional view of the preform member taken along line IX—IX in FIG. 8.

FIGS. 8 and 9 illustrate a third embodiment. The third embodiment is characterized in that the recess section 56 includes a groove 112 having a width W. As the introduction means 60, the groove 112 includes open ends 112E, 112E that communicate with the outer surfaces of the preform member 50.

According to the third embodiment, the molten metal is easily introduced to the bottom 112B of the groove 112 through the open ends 112E, 112E, and the configuration of the introduction means 60 is simplified so as to be easily formed in the preform member 50.

Figure 10:
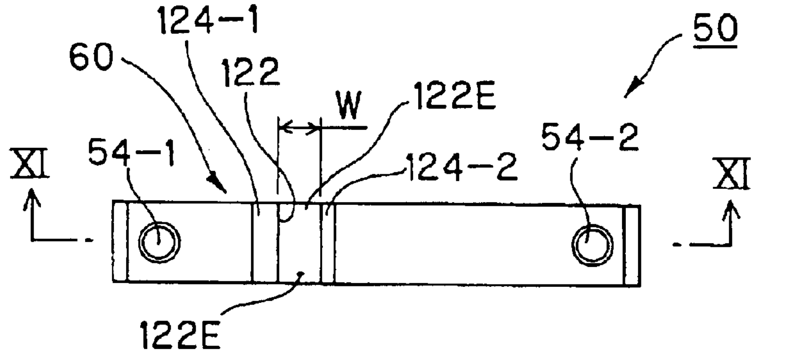
FIG. 10 is a plan view of a preform member according to a fourth embodiment.
Figure 11:
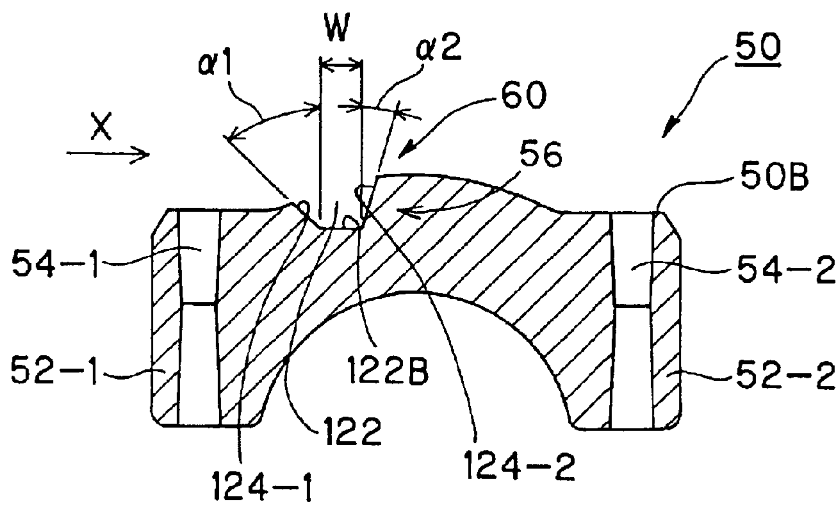
FIG. 11 is a cross-sectional view of the preform member taken along line XI-XI in FIG. 10.

FIGS. 10 and 11 illustrate a fourth embodiment of the present invention. The fourth embodiment is characterized in that the recess section 56 includes a groove 122 having a width W. The introduction means 60 includes open ends 122E, 122E and first and second inclined surfaces 124-1, 124-2 that are inclined at respective angles $\alpha 1$, $\alpha 2$ with respect to the flow direction X of the molten metal.

According to the fourth embodiment, the molten metal can be easily introduced to the bottom 122B of the groove 122 through the inclined surfaces 124-1, 124-2 to effectively prevent blowholes.

Figure 12:
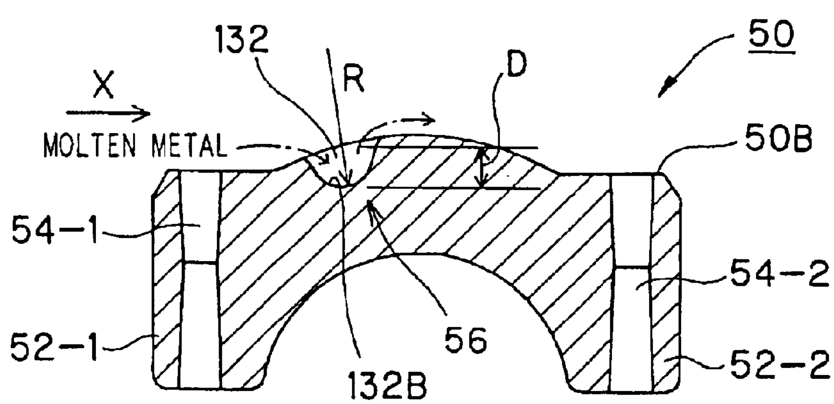
FIG. 12 is a cross-sectional view of a preform member according to a fifth embodiment.

FIG. 12 illustrates a fifth embodiment as a configuration of the present invention. The fifth embodiment is characterized in that the recess section 56 includes a semicircular groove 132 having a radius "R" and a depth "D". According to the fifth embodiment, the semicircular groove 132 in the recess section 56 easily introduces the molten metal to the bottom 132B, which simplifies the form of the recess section 56.

Figure 13:
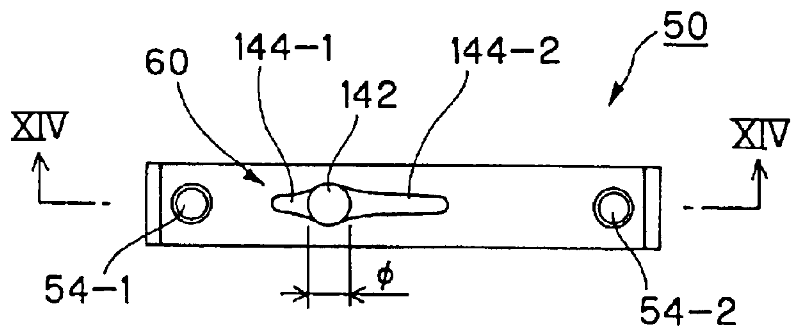
FIG. 13 is a plan view of a preform member according to a sixth embodiment.
Figure 14:
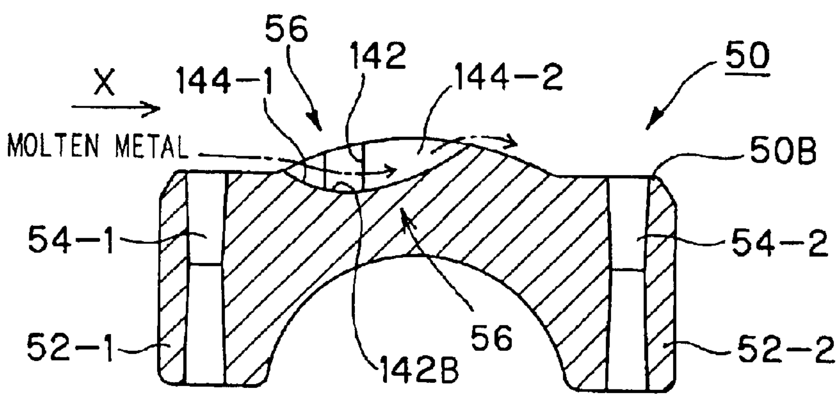
FIG. 14 is a cross-sectional view of the preform member taken along line XIV—XIV in FIG. 13.

FIGS. 13 and 14 illustrate a sixth embodiment as a configuration of the present invention. The sixth embodiment is characterized in that the recess section 56 includes a hole 142. In addition, as the introduction means 60, a first introduction groove 144-1 is formed in a first side of the hole 142, which groove extends to the bottom 142B of the hole 142 in the flow direction "X" of the molten metal. A second introduction groove 144-2 is formed in an opposite second side of the hole 142, which groove extends from the bottom 142B upwardly to the surface 50B over a certain length.

According to the sixth embodiment, the molten metal flows from the first introduction groove 144-1 through the bottom 142B of the hole 142 to the second introduction groove 144-2, which easily introduces the molten metal to the bottom 142B to effectively prevent blowholes.

Figure 15:
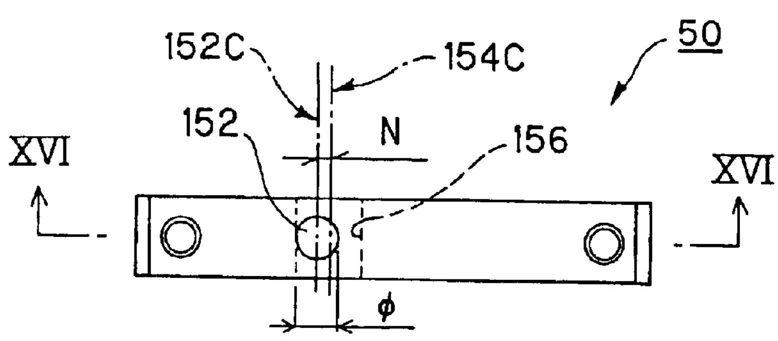
FIG. 15 is a plan view of a preform member according to a seventh embodiment.
Figure 16:
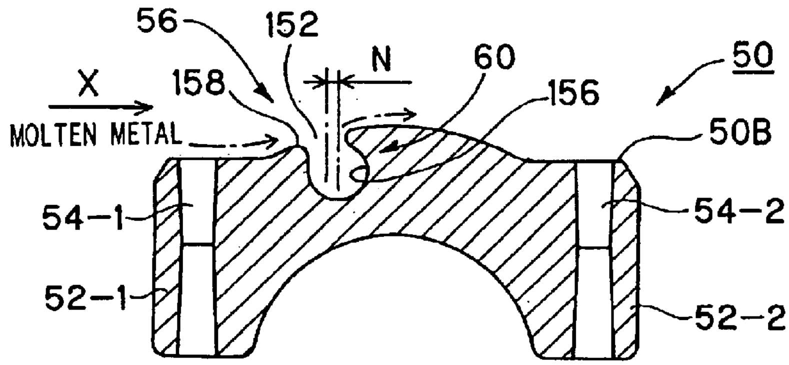
FIG. 16 is a cross-sectional view of the preform member taken along line XVI—XVI in FIG. 15.
Figure 17:
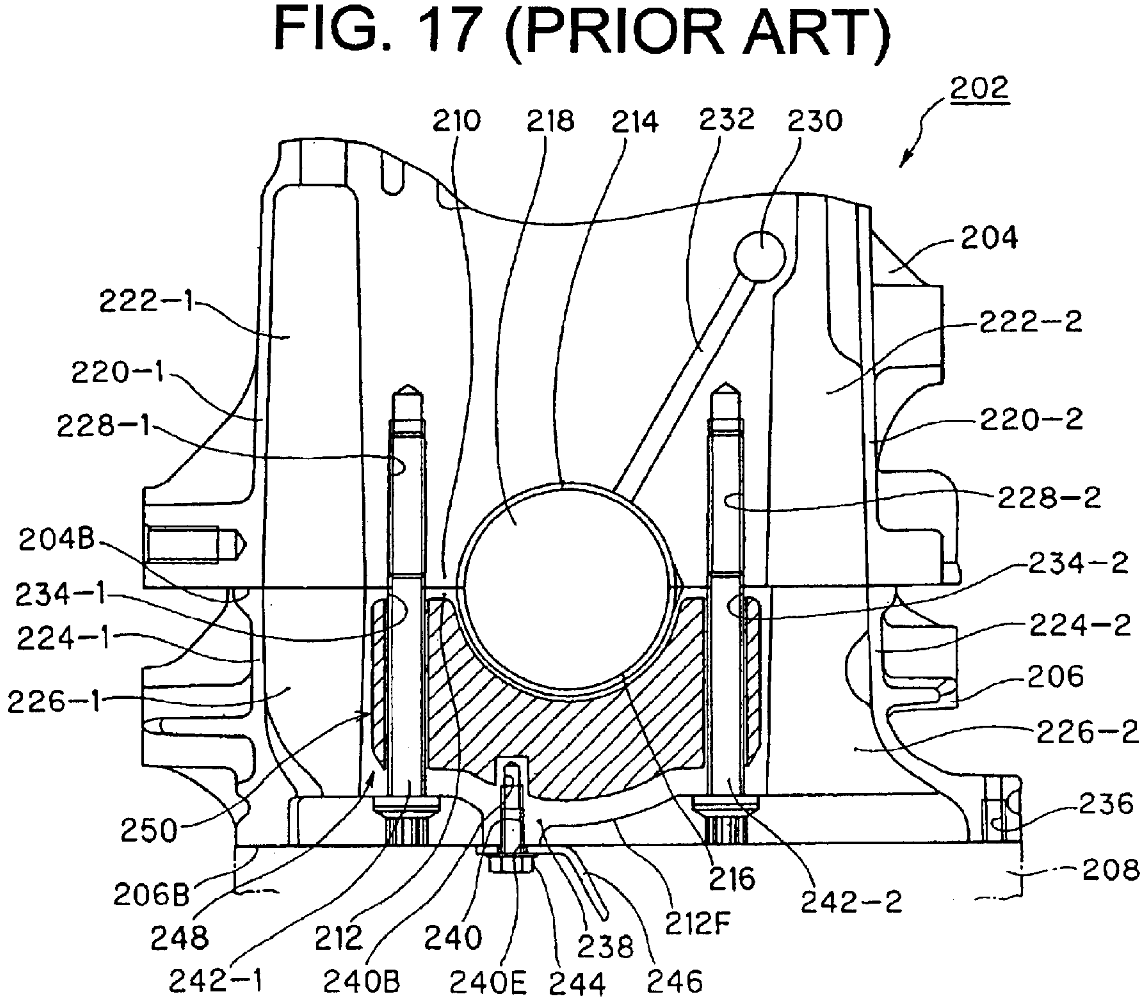
FIG. 17 is a fragmentary cross-sectional view of a conventional internal combustion vehicle engine.
Figure 18:
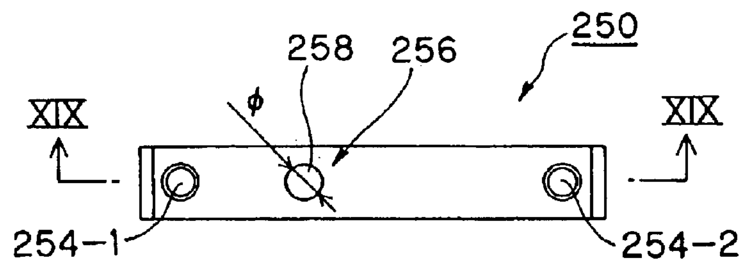
FIG. 18 is a plan view of a conventional preform member.
Figure 19:
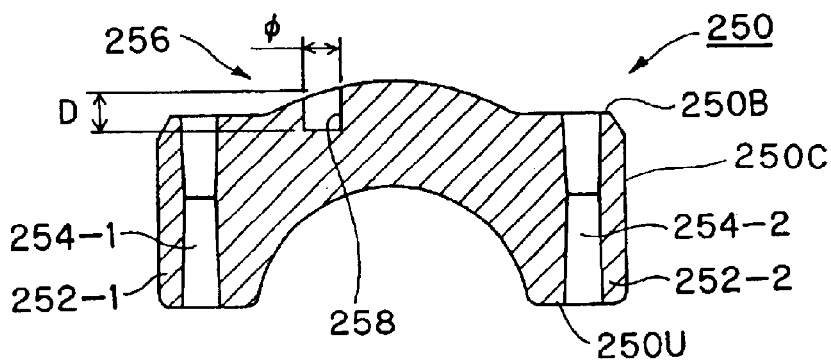
FIG. 19 is a cross-sectional view of the preform member taken along line XIX—XIX in FIG. 18.
Figure 20:
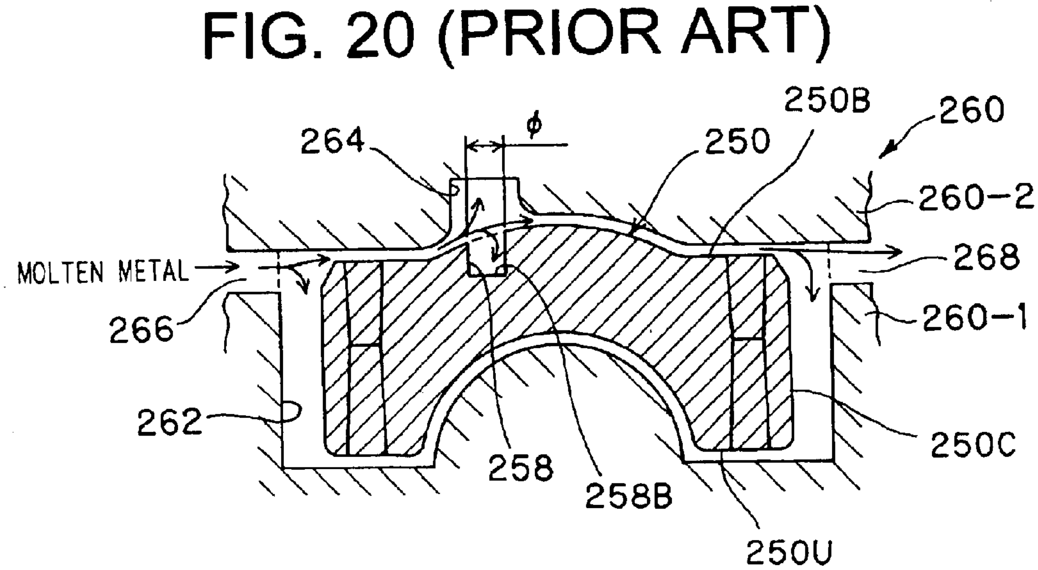
FIG. 20 is a cross-sectional view of the lower crankcase during casting in a conventional manner.
Figure 21:
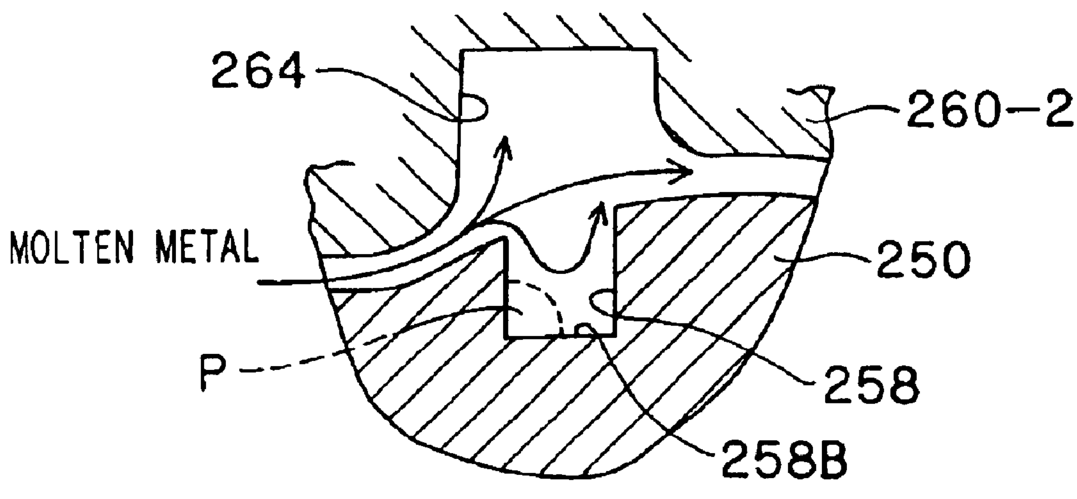
FIG. 21 is an enlarged cross-sectional view of the recess in FIG. 20.

FIGS. 15 and 16 illustrate a seventh embodiment as a configuration of the present invention. The seventh embodiment is characterized in that the recess section 56 includes a hole 152 having a bore diameter Ø. As the introduction means 60, a transverse introduction passage 156 is formed for communication with a bottom of the hole 152. The passage 156 is defined by a bore larger than that of the hole 152 and its center 154C is displaced in the downstream molten metal flow direction X by a distance N from a center 152C of the hole 152. The introduction passage 156 is formed so that it penetrates both sides of the preform member 50. Thereby, the hole 152 has a small round inlet or mouth at the surface of the preform, and the round outwardly protruding bank or shoulder 158 is defined on the surface 50B of the preform member 50 adjacent an upstream side of the open end or mouth of the hole 152.

According to the seventh embodiment, since the round lip or bank 158 is formed on the surface 50B of the preform member 50, the molten metal is easily introduced into the hole 152 and the introduction passage 156 during casting. And the introduction passage 156 is displaced in the molten metal flow direction downstream away from the hole 152, which effectively prevents blowholes. The inlet of the hole 152 is partially closed, which enhances the strength in the bottom 40B of the screw hole 40 when the mounting bolt 44 is fixed therein.

As thus described, the present invention provides the screw hole having one opened end defined in the outer surface of the bearing holder, and a concave recess section in the preform member to accommodate the bottom of the screw hole, and an introduction passage means in the recess section to introduce molten metal therein during casting. As a result, the molten metal is introduced to the bottom of the recess section to effectively prevent blowholes.

Forming of the preform 50, the materials thereof, and the casting thereof into a bearing supporter is disclosed in greater detail in Assignee's U.S. Pat. No. 6,543,334, the relevant disclosure of which is incorporated herein by reference.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A crankshaft supporter having a bearing holder to support a bearing that supports a crankshaft, said bearing holder being molded in aluminum alloy, and a preform member cast inside of the aluminum alloy, comprising:

a screw hole having one opened end in an outer surface of said bearing holder;

a concave recess section in said preform member to accommodate a bottom of said screw hole; and an introduction passage in said recess section to introduce molten metal into said recess section during casting.

2. The crankshaft supporter as defined in claim 1, wherein said recess section includes a hole, and said introduction passage includes an inclined surface which is a part of an inner wall of said hole and which is inclined with respect to a flow direction of the molten metal.

3. The crankshaft supporter as defined in claim 1, wherein said recess section includes a hole, and said introduction passage penetrates first and second sides of an inner wall of said hole and first and second outer surfaces of said preform member.

4. The crankshaft supporter as defined in claim 1, wherein said recess section includes a groove, and said introduction passage includes an end of said groove formed as an open end that communicates with an outer surface of said preform member.

5. The crankshaft supporter as defined in claim 4, wherein said introduction passage includes an inclined surface in which an inner wall of said groove is inclined toward a flow direction of the molten metal.

6. A crankshaft bearing supporter for attachment to a cylinder block of an engine for rotatable support of a crankshaft, said crankshaft bearing supporter comprising a preform of composite material defining thereon an upwardly facing concave arcuate surface and a downwardly facing bottom surface provided with a blind bore opening upwardly from said bottom surface and defining a closed end remote from said bottom surface, first and second communication passages formed in said preform and communicating with opposite sides of the blind bore adjacent the closed end thereof, said communication passages at other ends thereof opening outwardly through surfaces of the preform, and an outer cast aluminum alloy layer surrounding and penetrating the preform, the aluminum alloy layer completely filling the blind bore and the first and second communication passages, and a screw hole opening and projecting inwardly into the cast aluminum alloy which fills the blind bore.

7. A crankshaft bearing supporter according to claim 6, wherein said first and second communication passages are respectively defined by first and second sloped surfaces which communicate with opposite sides of said blind bore adjacent the closed end thereof and which are reversely sloped as they project outwardly from opposite sides of the blind bore for communication with said bottom surface.

8. A crankshaft bearing supporter according to claim 6, wherein said first and second communication passages project sidewardly in opposite directions away from said blind bore for communication with opposite side surfaces of the preform.

9. A crankshaft bearing supporter according to claim 8, wherein said first and second communication passages also open transversely through said bottom surface.

10. A crankshaft bearing supporter according to claim 8, wherein said first and second communication passages are spaced from and do not penetrate said bottom surface.

11. A crankshaft bearing supporter according to claim 10, wherein said first and second communication passages define an enlargement which communicates with said blind bore adjacent the closed end thereof but which is enlarged transversely in spaced relationship from said bottom surface to define an undercut concavity which is filled with said cast aluminum alloy.

12. A crankshaft bearing supporter according to claim 6, wherein the cast aluminum alloy layer also defines a postlike protrusion which protrudes outwardly a significant extent from said bottom surface generally in alignment with the blind bore, and said screw hole opens inwardly through the postlike projection into the cast aluminum alloy which fills the blind bore.

13. A process for forming a crankshaft bearing supporter for supporting the crankshaft of an internal combustion engine, comprising the steps of:

providing a preform of a composite material having a concave arcuate bearing recess formed in an upper surface thereof and also having a bottom surface spaced downwardly from said upper surface;

forming a blind opening in said preform which opens upwardly from said bottom surface and terminates at a generally closed upper end;

providing first and second communication passages which respectively communicate with generally opposite sides of said blind opening in the vicinity of the closed upper end thereof, said first and second communication passages at opposite ends thereof opening outwardly of the preform at locations disposed generally on opposite sides of the opening;

positioning the preform within a space defined by a mold arrangement;

providing said mold arrangement with a reentrant opening which communicates with the space generally in alignment with the blind opening formed in said preform;

supplying molten aluminum alloy into the space so as to embed the preform within the aluminum alloy and fill the blind opening, the communication passages, and the reentrant opening with said aluminum alloy to define an outwardly-protruding postlike portion for permitting auxiliary engine parts to be anchored thereto.

14. A process according to claim 13, including the steps of flowing the molten aluminum alloy into and through the space surrounding the preform in a direction generally transverse to a mouth of said blind opening as defined in said bottom surface; and orienting the first and second communication passages so that they allow flow of molten aluminum alloy toward or away from the bottom of the blind opening independent of the mouth.

15. A process according to claim 14, including the steps of inclining the first communication passage from the bottom of the blind opening in an upstream direction of the flowing aluminum alloy for communication along the bottom surface upstream of the mouth, and inclining the second communication passage in the opposite direction for communication along the bottom surface downstream of the mouth.

16. A process according to claim 13, including the steps of orienting the first and second communication passages so that they project outwardly from generally opposite sides of the blind opening in directions generally transverse to the flow direction of the aluminum alloy through the space.

17. A process according to claim 13, including the step of providing the communication passage with an enlarged undercut portion which communicates with said blind opening adjacent the closed end thereof but which is spaced interiorly from said mouth.

18. A process according to claim 13, including the step of forming a blind screw hole which extends through the postlike projection into the cast aluminum alloy which fills the blind opening.

* * * * *